J. D. BELL.
TORPEDO PLACING MACHINE.
APPLICATION FILED APR. 1, 1912.
1,057,917.
Patented Apr. 1, 1913.
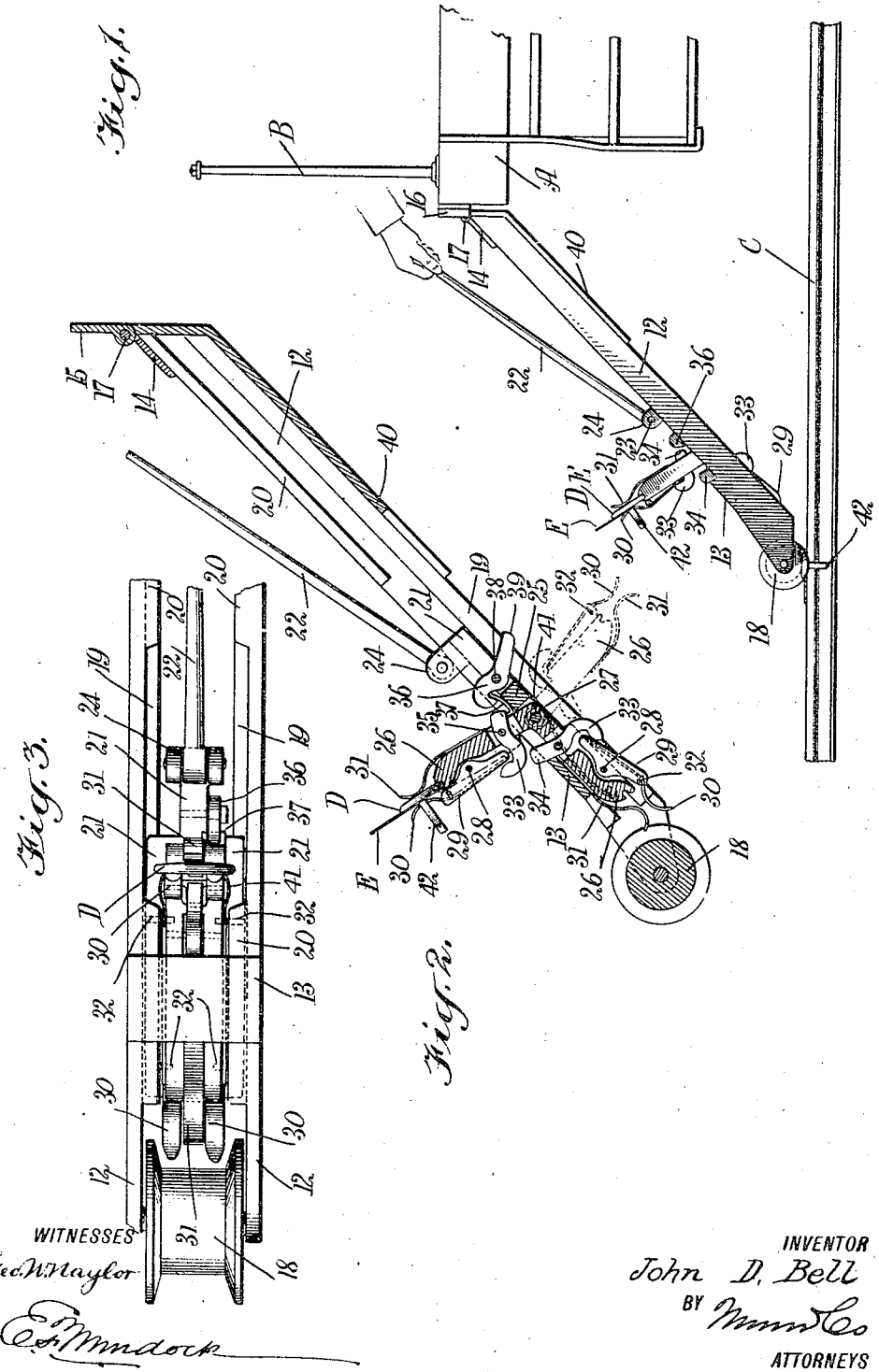
WITNESSES
Geo. W. Naylor
C. S. Murdock
INVENTOR
John D. Bell
BY Munn & Co
ATTORNEYS

UNITED STATES PATENT OFFICE.

JOHN DAVID BELL, OF ARCADIA, KANSAS.

TORPEDO-PLACING MACHINE.

1,057,917.  Specification of Letters Patent.  Patented Apr. 1, 1913.

Application filed April 1, 1912. Serial No. 687,599.

*To all whom it may concern:*

Be it known that I, JOHN D. BELL, a citizen of the United States, and a resident of Arcadia, in the county of Crawford and State of Kansas, have invented a new and Improved Torpedo-Placing Machine, of which the following is a full, clear, and exact description.

The present invention more particularly relates to improvements in the construction and arrangement of the torpedo-placing machine disclosed in Letters Patent of the United States granted to me under date of January 9, 1912, and numbered 1,014,561, to which reference is here made.

Among the principal objects which the present invention has in view are: to provide means whereby a plurality of torpedoes may be successively and rapidly deposited on the rail of a railway bed; and to simplify the construction, so that the retraction of the holder, after the deposit of one torpedo, disposes a succeeding torpedo in position to be deposited.

Reference is to be had to the accompanying drawings forming a part of this specification, in which similar characters of reference indicate corresponding parts in all the views, and in which—

Figure 1 is a side view of a machine constructed and arranged in accordance with the present invention, and showing in conjunction therewith a fragment of the platform of a railway carriage. Fig. 2 is a vertical section of the machine, taken on the median line; and Fig. 3 is a top plan view, on enlarged scale, of an end fragment of the machine.

As shown in the previous patent, the trailer frame is provided with side rails 12, united adjacent the lower end by a cross brace 13, and at the upper end by a cross brace 14. The trailer frame is provided with a hinge section 15. The hinge section 15 is mounted in brackets 16, which are rigidly attached to the platform A of the railway carriage. In this manner, the trailer frame is removably mounted upon the railway carriage. The hinge section 15 is secured to the structure of the trailer frame by a hinge pin 17, which supports the upper end of said trailer frame when in operative position. The lower end of said frame is supported by a grooved roller 18, the said roller being mounted between the rails 12 of said frame. The rails 12 are provided, on the inner side of each, with flanges 19 and 20. The flanges 19 extend the full length of the rails 12, to form the normal support for a sliding block 21. The flanges 20 are cut away, as shown best in Fig. 3, to form an opening equaling or exceeding in length the block 21, whereby said block may be removed from engagement with the trailer frame, and whereby the trailer frame may be charged or loaded with said block and the torpedoes carried thereby. The inoperative position of the trailer frame is that wherein it is swung on the hinge pin 17 to assume a vertical position substantially parallel with the hand rail B of the railway carriage structure. It will be understood that the trailer frame is only lowered to the position shown in Fig. 2 of drawings during the operation of depositing the torpedoes in the rear of a running train.

The block 21 is utilized to lower the end of the trailer frame, to rest the roller 18 on the railway track C. It is also utilized to lift the trailer frame to the upright position just above referred to, where the frame is secured to the hand rail B. When operated for the latter purpose, the block is moved toward the end of the trailer frame adjacent the hinge 17, the said block passing between the upper ends of the flanges 19 and 20. The block is moved to this position manually, the person grasping, for this purpose, a handle 22. The handle 22 is secured by a pin 23, pivotally, to tabs 24 extended from the body of the block 21. The block 21 is bifurcated, or consists of two parallel side members connected structurally by a cross bar 25, as seen best in Fig. 2 of drawings.

Pivotally mounted upon a pin 27 in advance of the cross bar 25, is a double extension rocking holder. Each holder is provided with a head 26, the under side of which is shaped to provide space for the pivot pins 28 of rocking members 29. The members 29 are each provided to open spring jaws 30, which are mounted on the block 21, to operate in conjunction with a spring 31, to hold firmly but lightly a torpedo D, as seen in Fig. 2 of drawings. The springs 30 are rigidly mounted in the side rails 12 and operate to rock the members 29, to close the forward ends thereof toward the head 26. For this purpose, each member 29 is provided with a pin 32 extended in the path of the springs 30, as seen best in Fig. 3 of drawings. In the normal position, where the springs 30 are unrestrained, the said springs, in conjunction with the spring 31, clamp the torpedo D, and hold the same in position for deposit upon the railway rail C.

Each of the members 29 is rocked by a trigger member 33, the lower or toe end of which normally rests beneath the free end of the members 29, while the heads 34 of the members 33 are extended above the block 21 in the path of the cross brace 13. The members 33 are pivoted adjacent each of the heads 26, upon pins 35. When in the operation of the machine, the block 21 is forced down toward the rail C, the head 34 on each of the trigger members strikes upon the brace 13, and is rocked thereby, to cause the toe end of the member 33 to lift the free end of the member 29 adjacent. The rocking of the member 29 in this manner depresses or opens the springs 30, to release the torpedo D.

The double extension holder having the heads 26 is initially maintained in the position shown in the drawings at Figs. 1 and 2 by a latch 36. The latch 36 is furnished with a hook end to engage a latch plate 37, which is rigidly mounted upon the double holder. The latch 36 is pivotally mounted by means of a pin 38, between the sides of the block 21 and the tailpiece 39 of said latch extends between the flanges 19 into the path of a floor plate 40.

When the machine is charged with the torpedoes D, the double holder is rotated upon the pin 27 to the position shown in Fig. 2 of drawings. In this position, the tension of the coiled spring 41 is exerted to rotate the holder to the position shown in dotted lines in Fig. 2 of drawings. Against the tension of the spring 41, the latch 36 maintains the double holder in set position, engaging for this purpose the latch plate 37. The torpedoes D having been inserted between the jaws 30 and 31, the blocks 21 are introduced through the opening provided in the flanges 20, and are moved toward the brace 13. When, now, it becomes necessary for the brakeman to put a cartridge or torpedo on the track, behind the moving train, he lowers the trailer frame, until the roller 18 rests upon the rail C. In this position, a flexible tailpiece E, with which the torpedoes are provided, is extended upon the tread of the rail C, to adjacent the roller 18, just avoiding insertion between the said roller and rail. The above-mentioned position of the tailpiece E of the torpedo is arrived at when the block 21 has been moved, so that one arm of the double holder is extended below the brace 13, in which position, the head 34 of the trigger member 33 rests in contact with said brace. It will be seen that if now the brakeman presses, by means of the handle 22, the block 21 toward the rail C, the trigger member 33 is rocked on the pin 38, to open the jaws 30, to release the previously-contained torpedo. Coincident with this action, the roller 18 passes over the tailpiece E, and thereby holds the torpedo in place on the rail C. Each torpedo is provided with semi-circular clips 42, which, when the torpedo is depressed, snap around the head of the rail C, to hold the torpedo in place. The torpedo having been released by the jaws 30, the wheel 18 overrides the same, leaving it stationarily positioned upon the rail by the clip 42, as seen best in Fig. 1 of drawings. When, now, the operator, desiring to place a second torpedo on the rail, lifts the block 21, the tailpiece 39 engages the floor plate 40, and is rocked thereby, so that the latch 36 releases the plate 37 to permit the spring 41 to rotate the double holder, until the second arm thereof having the head 26, is disposed in substantially the position occupied by the other arm of the holder, which has just been relieved of its torpedo, and which has moved into the position shown in dotted lines in Fig. 2. The block 21 is now depressed, until the head 34 of the second holder rests in contact with the brace 13, when, as above described, the tailpiece E of the torpedo D is in position to be engaged by the roller 18. The further pressure on the handle 22 now releases the second torpedo if disposed upon the rail C. The double holder having been thus relieved of both of the torpedoes, the handle 22 and block 21 connected therewith are drawn back, until the block 21 passes under the upper extensions of the flanges 20. A lift is now exerted upon the trailer frame, which is swung on the pin 17 until the frame is disposed in upright position adjacent the rail B. In this position, and after the trailer frame is secured, the block 21 and parts connected therewith are removed from the frame, and the torpedoes are replaced in the grasp of the jaws 30, and the double holder is rotated to the position shown in Fig. 2 of drawings. When the block 21 is now again placed in the trailer frame, the device may be operated again in the manner as above described.

Having thus described my invention, I claim as new and desire to secure by Letters Patent:—

A machine such as described, having a plurality of arms pivotally mounted in a sliding frame; a plurality of spring jaws, each mounted on one of said arms; a latch mounted on said frame to hold said arms in an initial position; means for rotating said arms to present said jaws in delivery position successively; means manually operative for moving said latch to release said arms; and means manually operative for successively opening said jaws to release the torpedoes when said jaws are in operative position.

In testimony whereof I have signed my name to this specification in the presence of two subscribing witnesses.

JOHN DAVID BELL.

Witnesses:
F. A. JEWELL,
W. W. JEWELL.